April 28, 1959 S. P. CALDWELL 2,883,756
TRIMMING GUIDES
Filed Feb. 25, 1957 2 Sheets-Sheet 1
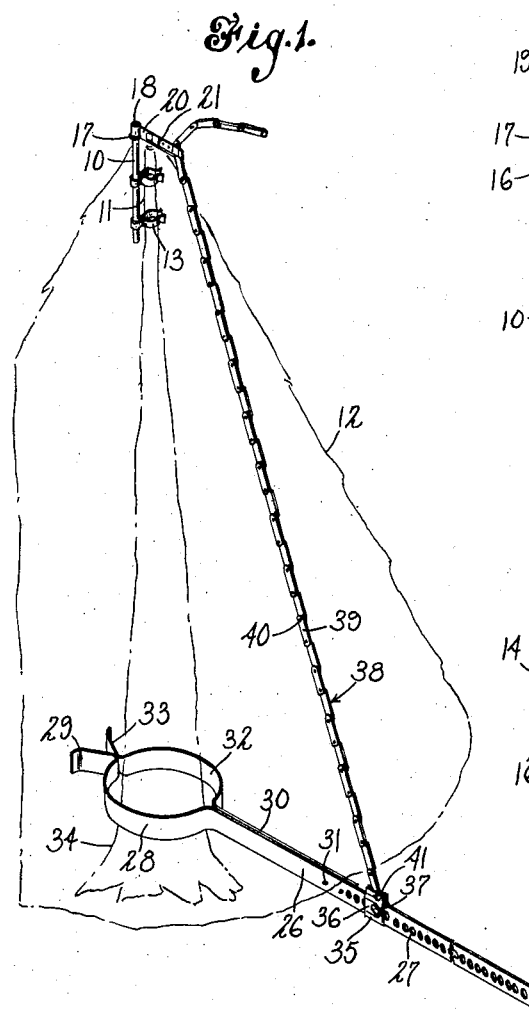
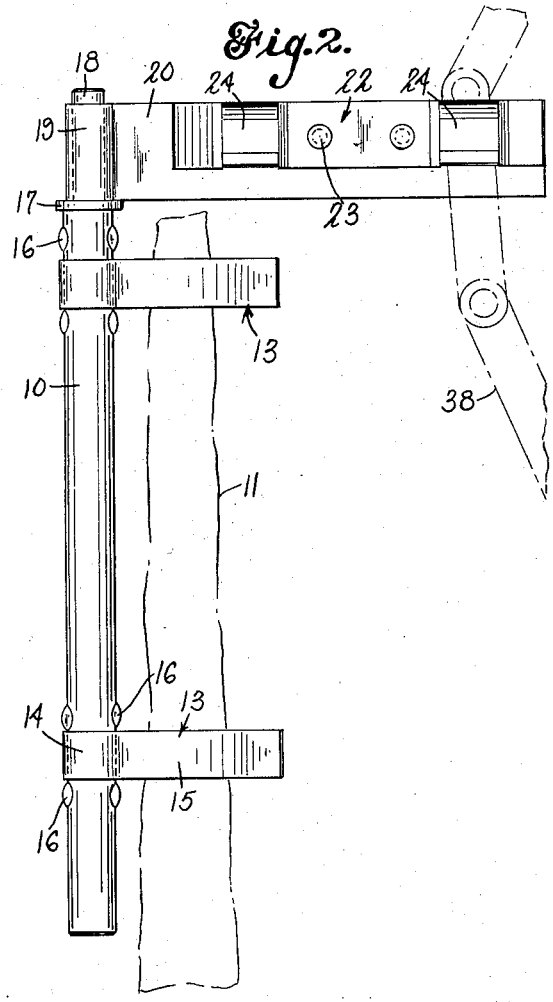
INVENTOR
Samuel P. Caldwell
BY
ATTORNEYS

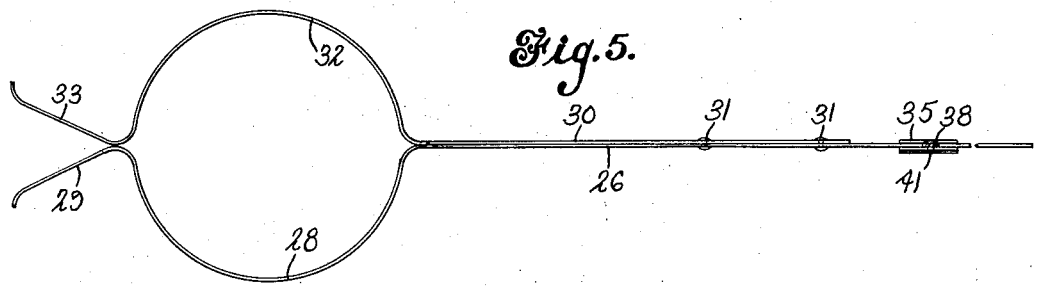
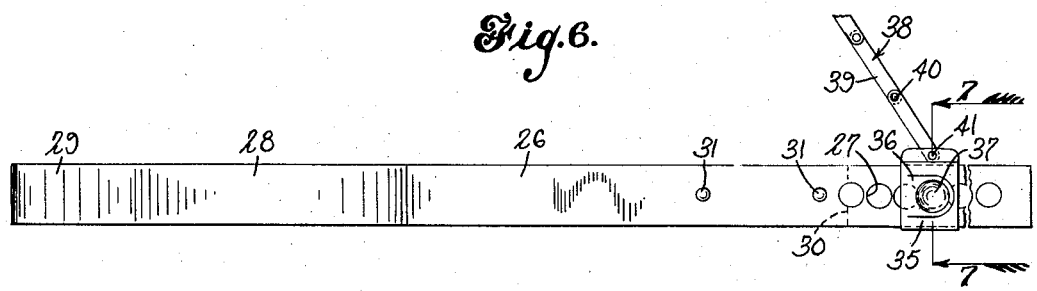
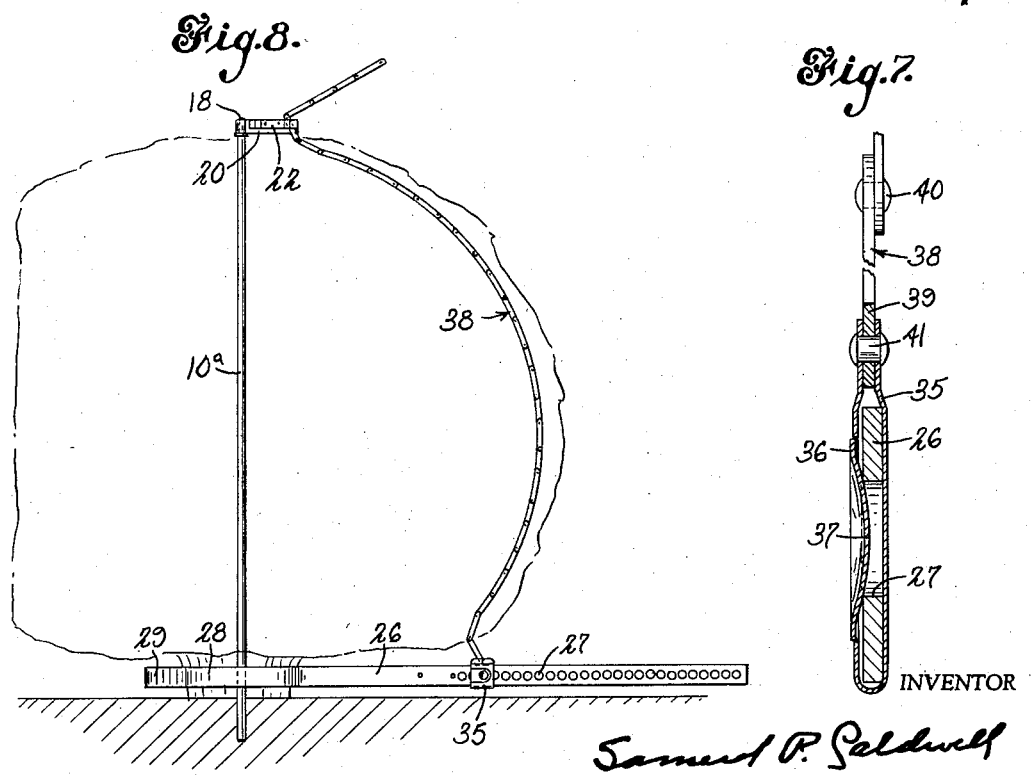
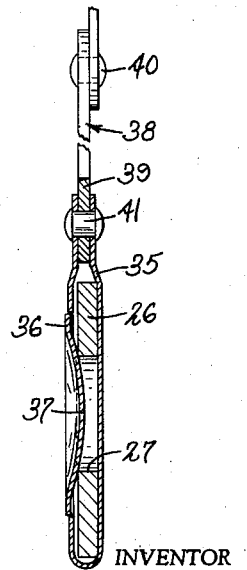

United States Patent Office 2,883,756
Patented Apr. 28, 1959

---

2,883,756

TRIMMING GUIDES

Samuel P. Caldwell, Hamden, Conn., assignor to The Greist Manufacturing Company, New Haven, Conn., a corporation of Connecticut Application February 25, 1957, Serial No. 642,228

7 Claims. (Cl. 33—174)

---

This invention relates to a tree-trimming guide and more particularly to a device of universal application which may be employed as a guide for trimming either a tree or shrub.

In trimming trees and shrubs, particularly those used in ornamental plantings, it is desirable, particularly for the amateur, to employ a guide which may be positioned adjacent the tree to serve as a guide for the trimming shears in order to trim the tree or shrub symmetrically and to the proper shape and size. It is particularly desirable to have such a device which may be of universal application so that it may be employed in connection with a tree or in connection with a bush or shrub.

The device shown in the present application is provided with a guide member and upper and lower supporting members to which the guide member is attached. These supporting members may be, particularly in the case of a tree, supported upon the upper and lower portions of the tree itself and, in order that the device be also usable with shrubs or bushes, a central post may be provided to carry the upper and lower supports as a tree trunk would not ordinarily be available in this case. The guide itself is preferably a moldable or formable member in order that it may be formed or molded to any shape desired for the profile of the shrub or tree and retain this shape during the trimming operation.

Moreover, the upper and lower supports for the guide member are so arranged that the latter may be adjustably secured thereto so that the upper and lower ends of the guide member may be attached to these supports at various distances from the tree trunk or center of the shrub.

One object of the present invention is to provide a new and improved trimming guide for use in trimming trees or shrubs.

Still another object of the invention is to provide a trimming guide having upper and lower supports adapted to support a guide member and means for securing these supports in proper positions with respect to the tree or shrub to be trimmed.

Still another object of the invention is the provision of a trimming guide of the character described wherein the guide member may be so supported that it may be rotated about the approximate axis or center of the tree or shrub so that the entire outline of the latter may be trimmed.

A still further object of the invention is the provision of a trimming guide of the character described wherein the guide member may be adjustably attached to upper and lower supporting members whereby the points of attachment may be at various distances from the center of the tree or shrub being trimmed.

A further object of the invention is to provide a tree-trimming guide of the character described wherein the guide itself will be a moldable or formable member designed to be mounted or formed into the desired shape and adapted to retain such shape during the trimming operation.

To these and other ends the invention consists in the novel features and combinations of parts to be hereinafter described and claimed.

In the accompanying drawings:

Fig. 1 is a perspective view of a tree-trimming guide embodying my invention;

Fig. 2 is an elevational view of the upper portion of the structure showing the upper supporting member attached to the trunk of the tree;

Fig. 3 is a top plan view of the structure shown in Fig. 2;

Fig. 4 is a top plan view of the clips employed for securing a post or shaft to the upper portion of the tree;

Fig. 5 is a top plan view of a retaining arm structure employed at the lower portion of a tree or shrub as a support for the guide member;

Fig. 6 is an elevational view of the retaining arm shown in Fig. 5;

Fig. 7 is a sectional view on line 7—7 of Fig. 6; and

Fig. 8 is a side elevational view of a slightly modified form of device for use with a shrub or brush.

To illustrate a preferred embodiment of the invention there is shown in the drawing a trimming guide comprising upper and lower supporting members and a guide member extending between the upper and lower supports and secured thereto.

The upper supporting device, as shown in Figs. 1 and 2, comprises a shaft or post 10 designed to be secured to the trunk 11 of a tree shown in outline at 12 by spring clips 13 shown more especially in Figs. 3 and 4. These spring clips are so formed as to provide an eye 14 for the post 10 and an eye 15 for the trunk of the tree. They are formed of resilient material so that they will snap or clamp upon the tree trunk to hold the post in place. The post may be provided with lugs or projections 16 above and below the eye 14 of the clips 13 to prevent relative movement between the clips and the post.

The post 10 is, as illustrated, provided with a shoulder 17 above which is a reduced end portion 18 to rotatably receive the eye 19 of an upper support arm 20 so that the latter will extend laterally or in a horizontal direction from the post. A resilient clamp member 22 is secured intermediate its ends by rivets 23 to the upper support arm 20, the ends of this member being left free so that they may be sprung away from the arm 20, as shown in dotted lines in Fig. 3. Adjacent its ends this member is bowed outwardly, as shown at 24, so as to provide spaces 25 between this clamp member and the support 20 to receive the elongated guide member as will be hereinafter described.

The lower support comprises an arm 26 having a plurality of openings 27 therein, this arm being adapted to be clamped to the trunk of a tree or the like, as shown in Fig. 1. To this end the inner end of the arm, which is of resilient material, is bowed outwardly, as shown at 28, in substantially semi-circular form and provided with an outwardly directed end portion 29. A cooperating retaining member 30 is secured at one end to this arm by riveting, welding or the like, as shown at 31, and is provided with a substantially semicircular clamping portion 32 to cooperate with the portion 28 of the arm 26. This member is also provided with a free end 33 which extends in diverging relation to the free end 29 of the arm 26. As both members 26 and 30 are of resilient material and as they are secured together only at the point 31 adjacent the end of the retaining member 30, the free ends 29 and 33 may be sprung apart to receive therebetween the trunk of a tree which is to be trimmed, this trunk being indicated at 34, so that the latter will be disposed within the loop formed by the members 28 and 32.

As described, the free end of the arm 26 is provided with openings 27, which openings may be made in any desired number and which may extend inwardly toward the tree trunk as far as desired. If the row of these openings extends beyond the outer end of the member 30, they may be formed in both members 26 and 30.

Slidably mounted upon the arm 26 is a stirrup member 35. As shown in Fig. 7, this member may be made of sheet metal bent into U-shaped form with its walls spaced apart to receive the arm 26 slidably therebetween. One of the sides of the U-shaped member is cut out to provide a tongue 36, and the metal of this tongue is displaced inwardly, as shown at 37, so as to provide an inward projection or boss to engage in one of the openings 27 and releasably hold the stirrup in various adjusted positions along the arm 26.

Secured at its lower end to the stirrup 25 is the moldable guide member 38. The construction of this member may be considerably varied but preferably it is of such construction that it may be bent or formed into a desired shape and will retain such form against accidental displacement while being used. As illustrated, this member is an elongated articulated member comprising a plurality of links 39, the ends of which overlap and are riveted together, as shown at 40, to provide an elongated chain which may be bent or curved as desired as permitted by the rivets about which the links will pivot relatively to each other. The riveting, however, is effected with sufficient friction so that the links will stand in a position in which they are formed or molded so that this guide member or chain may be made to assume the desired form. As shown in Fig. 1, it consists of a substantially straight line between the lower and upper supporting members, while, as shown in Fig. 8, it may be formed in arcuate shape as may be desired when trimming a shrub or bush. It will, of course, be obvious that other forms may be employed.

The guide member 38 may be passed through either of the openings or spaces between the upper support member 20 and the spaced portions 24 of the spring clamp thereon in order to secure the guide member at its upper end to the support 20 in adjusted positions in a horizontal direction. In this way the upper end of the guide member may be secured at various distances from the supporting post 10. By springing the end portions of the member 22 away from the support 20 the upper end of the guide member may be adjusted lengthwise relatively to the support so as to vary its effective length between the upper and lower supports. The overlapped riveted ends of the links 39 will ordinarily not pass through the spaces between the members 24 and the member 20 so that the guide member will be held by the spring clamping member 22 in any desired position of adjustment with respect to its length.

In the use of the device the lower support member 26 will be clamped upon the trunk of a tree or shrub, as shown in Fig. 1, with the upper supporting member 20 thereon will be attached to the upper end portion of the tree trunk by the clips 13. The stirrup member to which the lower end of the guide member is pivoted, as shown at 41, is then adjusted along the arm 26 to the proper distance from the tree trunk and will be retained in this position against accidental displacement by the engagement of the boss 37 in one of the openings 27, it being understood that the tongue 36 is sufficiently resilient to permit this action.

The guide member 38 may then be secured to the upper support member 20 by moving outwardly one of the free ends of the member 22 and passing the links 39 through one of the spaces 25. Upon release of the free end of the member 22 the guide member will be held in position. The user will, of course, select the particular link to be disposed within the space 25 which will adjust the guide member to the proper length.

The user will then trim the foliage of the tree along the guide member 38 and, as the operation progresses, will swing this member about the periphery of the tree as it is understood that the lower support arm 26 will swing about the tree trunk while hte upper support member 20 is rotatably mounted on the post 18.

In some instances, when it is desired to trim a bush or shrub which does not have a central trunk, it will be convenient to replace the relatively short post 10 shown in Figs. 1 and 2 by the post 10ª which may be driven into the ground at approximately the center of the shrub. This post will be provided with an upper reduced end 18 as before upon which is rotatably received the upper support arm 20 and associated clamping member 22 as previously described. In other respects the modified form of structure shown in Fig. 8 is identical with that shown in Figs. 1 to 7.

While I have shown and described some preferred embodiments of my invention, it will be understood that it is not to be limited to all of the details shown, but is capable of modification and variation within the spirit of the invention and within the scope of the claims.

What I claim is:

1. A trimming guide mechanism for trees or shrubs comprising upper and lower substantially horizontally disposed support members for attachment to the tree or shrub, means for holding said members in spaced relation, an elongated moldable guide member extending between the two support members, means to secure said guide member to one of said supports for adjustment therealong in a horizontal direction and to secure said guide member to the other of said supports for adjustment in a vertical direction to vary the effective length of the guide member between said support members.

2. A trimming guide mechanism for trees or shrubs comprising upper and lower substantially horizontally disposed support members, means for holding said members in spaced relation, an elongated moldable guide member extending between the two support members, means securing said guide member to each of said support members, said means detachably securing the guide member to one of said support members, said holding means comprising a post upon which said upper support member is rotatably carried to rotate about the axis of the post, and attaching means secured to said post by which the latter may be attached to a tree.

3. A trimming guide mechanism for trees or shrubs comprising upper and lower substantially horizontally disposed support members, means holding said members in spaced relation, an elongated moldable guide member extending between the two support members, means securing said guide member to each of said support members, said means detachably securing the guide member to one of said support members, said lower support comprising a laterally extending arm, a rider slidably mounted on said arm, means for releasably retaining said rider in adjusted positions longitudinally of said arm, and the lower end of said guide member being secured to said rider.

4. A trimming guide mechanism for trees or shrubs comprising upper and lower substantially horizontally disposed support members, means holding said members in spaced relation, an elongated moldable guide member extending between the two support members, and means securing said guide member to each of said support members, said means detachably securing the guide member to one of said support members, the means securing said guide member to the upper of said supports comprising a resilient clamp member secured to the support member having a free end to permit reception of the guide member between the free end of the spring clamp and the support member.

5. A tree-trimming guide comprising a post having means thereon for securement to the trunk of a tree, an upper support member rotatably mounted on said post and extending laterally therefrom, a spring clamp carried by said support member, an elongated flexible guide member, said clamp having means for releasably clamping the guide member to the upper support member at various distances from said post, a lower support member comprising a laterally extending arm, a rider mounted on said arm for adjustment longitudinally thereof, the lower end of said guide member being attached to said rider, and means for attaching one end portion of said arm to the trunk of a tree.

6. A tree-trimming guide comprising a post having means thereon for securement to the trunk of a tree, an upper support member rotatably mounted on said post and extending laterally therefrom, a spring clamp carried by said support member, an elongated flexible guide member, said clamp having means for releasably clamping the guide member to the upper support member at various distances from said post, a lower support member comprising a laterally extending arm, a rider mounted on said arm for adjustment longitudinally thereof, the lower end of said guide member being attached to said rider, means for attaching one end portion of said arm to the trunk of a tree, said last-named means comprising a spring-retaining member secured adjacent its outer end to said arm, and being bowed outwardly adjacent the other end to cooperate with the adjacent portion of said arm and embrace the trunk of the tree.

7. A tree-trimming guide comprising a post having means thereon for securement to the trunk of a tree, an upper support member rotatably mounted on said post and extending laterally therefrom, a spring clamp carried by said support member, an elongated flexible guide member, said clamp having means for releasably clamping the guide member to the upper support member at various distances from said post, a lower support member comprising a laterally extending arm, a rider mounted on said arm for adjustment longitudinally thereof, the lower end of said guide member being attached to said rider, means for attaching one end portion of said arm to the trunk of a tree, said last-named means comprising a spring-retaining member secured adjacent its outer end to said arm, both said arm and said spring-retaining member being bowed outwardly adjacent their inner end portions to form a loop to embrace the trunk of a tree.

References Cited in the file of this patent

UNITED STATES PATENTS

| | | |
|---|---|---|
| 233,372 | Miner | Jan. 6, 1880 |
| 950,285 | Harper | Feb. 22, 1910 |
| 975,057 | Meeks | Nov. 8, 1910 |
| 1,130,072 | Donovan | Mar. 2, 1915 |
| 1,508,811 | Perkins-Kelly | Sept. 16, 1924 |
| 1,579,702 | Gottschalk | Apr. 6, 1926 |
| 1,753,698 | Gasparich | Apr. 8, 1930 |
| 1,987,010 | Hensley | Jan. 8, 1935 |
| 2,324,672 | Bierman | July 20, 1943 |
| 2,478,081 | Beets | Aug. 2, 1949 |
| 2,679,691 | Brownell | June 1, 1954 |
| 2,720,706 | Laine | Oct. 18, 1955 |

FOREIGN PATENTS

| | | |
|---|---|---|
| 486,551 | Italy | Nov. 11, 1953 |